April 25, 1967     E. S. McVEY     3,316,482
CONTROL CIRCUIT FOR SILICON CONTROLLED RECTIFIER SYSTEMS
Filed March 16, 1964     2 Sheets-Sheet 1

INVENTOR.
EUGENE S. McVEY
BY
Oberlin, Maky & Donnelly
attorneys

INVENTOR.
EUGENE S. McVEY 3,316,482
CONTROL CIRCUIT FOR SILICON CONTROLLED
RECTIFIER SYSTEMS
Eugene S. McVey, Charlottesville, Va., assignor to Basic Incorporated, Cleveland, Ohio, a corporation of Ohio
Filed Mar. 16, 1964, Ser. No. 352,038
18 Claims. (Cl. 323—22)

This invention relates, as indicated, to a circuit for regulating or controlling the operation of a silicon controlled rectifier, and it is a primary object of the invention to provide such a circuit which is both simple and reliable.

Prior proposals and efforts directed to the firing of a silicon controlled rectifier or rectifiers in accordance with a control signal in order to vary the rectifier output are considered unable to satisfy both the noted desiderata, with simple circuits not affording good control performance and those which will perform satisfactorily being fairly complicated. It has also been a common failure of available circuits that they employ expensive components regardless of their relative simplicity, and it is an additional object of the present improvements to provide a new circuit for the purpose the cost of which is significantly comparatively reduced.

Another object is to provide a version of a basic circuit for the desired silicon controlled rectifier regulation without susceptibility to temperature variations and the like.

It is also an object of the invention to provide a power supply in which the basic silicon controlled rectifier circuit is applied to the regulation of a power supply to maintain the output voltage of the supply at a constant value.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 2 is a diagram of a modification of the basic circuit having reduced tendency to drift as a result of temperature variation and the like.

Figure 1:
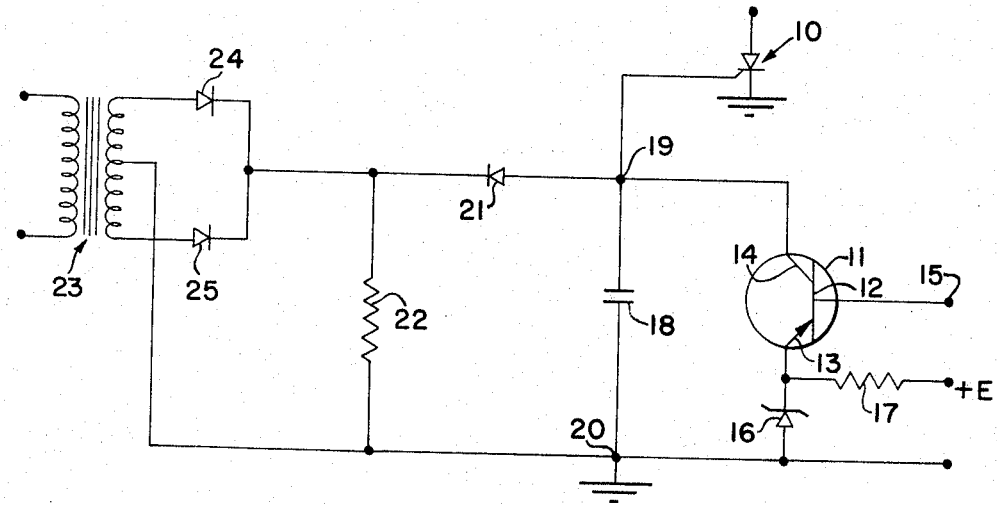
FIG. 1 is a diagram of the basic circuit provided by the invention.

With more particular reference now to the drawings, the circuit illustrated in FIG. 1 is intended to regulate the output of the silicon controlled rectifier designated by reference numeral 10, shown as being interposed between an output terminal and a ground.

In this circuit, there is a PNP transistor 11 comprising a base 12, an emitter, 13, and a collector 14, with the base of this transistor connected to a terminal 15 representing the positive side of an input control signal. A zener diode 16 is connected to the emitter 13 of the transistor and is biased by a voltage source E through a resistor 17 connected between the emitter and diode as shown. The voltage across the zener diode provides a supply voltage for the transistor and here also provides a reference voltage to which the input to the transistor can be compared, with this being its primary utility in most systems in which the invention would be applied. An integrating capacitor 18 is shown connected between points 19 and 20, with the former in connection to the collector 14 of the transistor and the latter at ground potential, also at the opposite side of the zener diode 16.

The capacitor 18 is charged by the collector current, as explained further hereinbelow, and a discharge path for the capacitor is provided by a diode 21, the anode of which is connected to the point 19, and a resistor 22 connected between the cathode of the diode and the ground at the system point 20. A transformer 23 having its primary connected to the alternating current input source drives a full wave rectifier comprising the diodes 24 and 25, which function by the connections shown to apply a pulsing direct current signal across the same resistor 22. The silicon controlled rectifier is connected to the circuit point 19 at the collector side of the transistor.

It will thus be seen that the variable input signal voltage applied to the base of the transistor 11 is compared in such component to the constant bias voltage provided by the zener diode 16 and that any difference in these voltage signals will cause base current to flow in the transistor. For changes of the control signal which are relatively small, the transistor input resistance will be constant and, therefore, a linear relationship will exist between the base current and the input control signal. The collector current is inherently related to the base current by a current gain constant, whereby the collector current is a linear function of the input signal, and the transistor serves as a perfect current source for charging the capacitor 18.

The selection of components is such that the voltage at the point 19 is always less than the voltage applied by the full wave rectifier to the resistor 22 at the opposite side of the diode 21, except when the input to the transformer 23 goes through or is close to zero. At such condition, the diode 21 becomes forward biased and discharges capacitor 18, thus synchronizing the circuit to the incoming alternating current. The current of the transistor collector is constant for any given control condition, whereby the voltage developed across capacitor 18 will be a ramp function during part of each half cycle and the slope is of course a direct function of the collector current. The value of resistor 22 is made quite small to insure substantially complete discharge to ground potential, which occurs in each half wave.

The operation will thus be seen to determine the firing of the silicon controlled rectifier 10 in accordance with the collector current, which must be equal to or greater than the required gate current in the absence of further amplification. When the gate voltage is developed across the integrating capacitor 18, the rectifier fires or becomes conductive, with the ramp angle controlled by adjustment of the input control signal. In each half cycle, the voltage applied to the cathode of the diode 21 will become zero, whereby the diode can conduct the capacitor charge through the resistor 22 if the collector voltage is positive. At all other times, the cathode of the diode 21 is at a positive potential with respect to ground, so that the diode is effectively disconnected during the existence of this condition. The discharge of the capacitor of course interrupts the conduction of the silicon controlled rectifier, and the time constant of the capacitance-resistance circuit (18, 22) is small enough in comparison to the period of the half cycle of the alternating current voltage input to permit this cyclic operation. The silicon controlled rectifier 10 is thus fired at a predetermined point in each half cycle and the output power of such component thereby regulable. The circuit thus basically provides comparison and amplification in the transistor, with the latter also serving as a perfect current source for charging the integrating capacitor associated therewith, while synchronization is obtained by the common derivation of the voltages applied at the respective sides of the diode 21. The latter can, in effect, be considered to bridge between the gate turn on voltage of the silicon controlled rectifier and the sinusoid voltage output of the full-wave rectified signal derived from the transformer 23. For practical conduction angles for the silicon controlled rectifier, the rate of change in voltage at the cathode of the diode 21 will be greater than across the capacitor 18 and the discharge thereof is thereby assured for the desired effective disconnection of the diode 21 in each half cycle.

The particular time during each half cycle at which the silicon controlled rectifier fires or conducts is a function of the input signal in view of the dependence of the slope of the ramp on the collector current, so that the power delivered by the silicon controlled rectifier is thus dependent upon the input signal and variable in the manner set forth in the above. The rectifier of course fires or conducts when the instantaneous value of the ramp, or the voltage across capacitor 18, becomes equal to the gate turn on voltage. These conditions and the mode of operation set forth can be realized with an economical transistor; for example, types which have been successfully employed are the very inexpensive 2N1303 and 2N1304.

Figure 2:
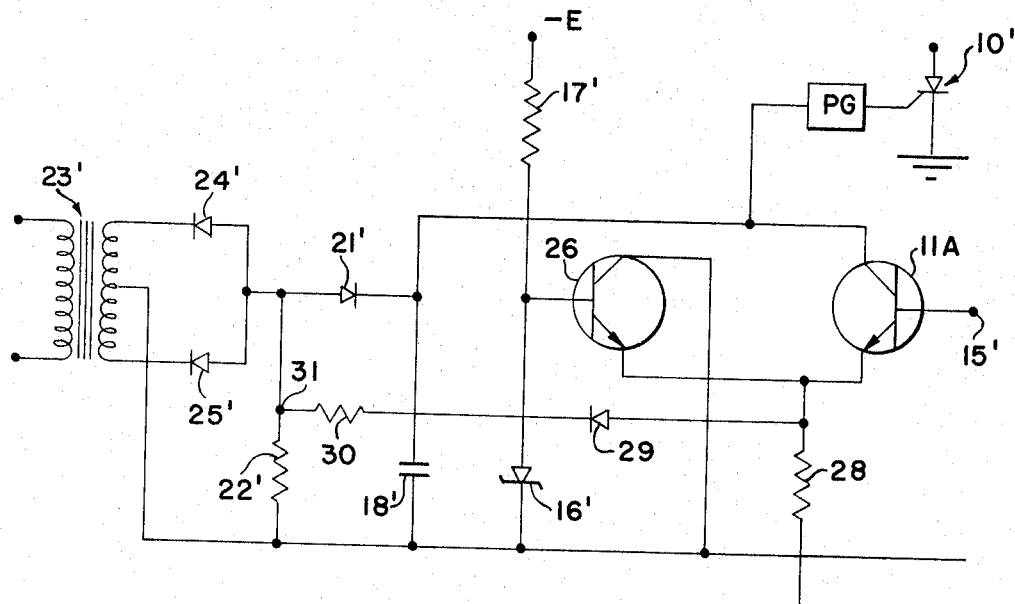

In the event that the basic control may be susceptible to variations in temperature or other environmental influences which would affect the stability of the operation, a modified circuit on the order shown in FIG. 2 can be utilized. In this circuit, the elements directly corresponding to those of the first described circuit are designated by the same numerals primed. It will readily be seen that the change involves the addition of a second active element in the form of the added transistor 26 connected in circuit with the transistor 11A so as to form a differential amplifier therewith. The zener diode 16' and resistor 17' are thus connected to the base of the transistor 26 to provide the reference voltage, with the input signal applied to the base of the transistor 11A. The transistors here are of the NPN type and the other unidirectional relations are according reversed, but this does not affect the mode of operation as will be understood. The emitters of the two transistors are commonly connected to a negative voltage source, as for example at terminal 27, through a resistor 28, and also commonly through diode 29 and resistor 30 to the point 31 between the diode 21' and resistor 22'. The capacitor 18' is in the same circuit relation, and a negative ramp output is produced which is fed to an appropriate comparison and pulse generating circuit, designated diagrammatically by the box PG. The inversion of the components noted and described provides the negative ramp output of the amplifier for regulation of the firing of the silicon controlled rectifier 10' through the interposed circuit PG wherein such ramp is compared to a constant reference direct current voltage and a positive pulse generated when the ramp equals this reference to thus determine the firing of the silicon controlled rectifier. As indicated by the diagrammatic representation, there are many circuits which can be used to adapt this negative ramp output to the desired control.

In the modified circuit of FIG. 2, it will be appreciated that any conditions commonly causing change in the transistor base and emitter relationship, such as temperature fluctuations, will occur to equal and therefore cancelling effect in both transistors.

Figure 3:
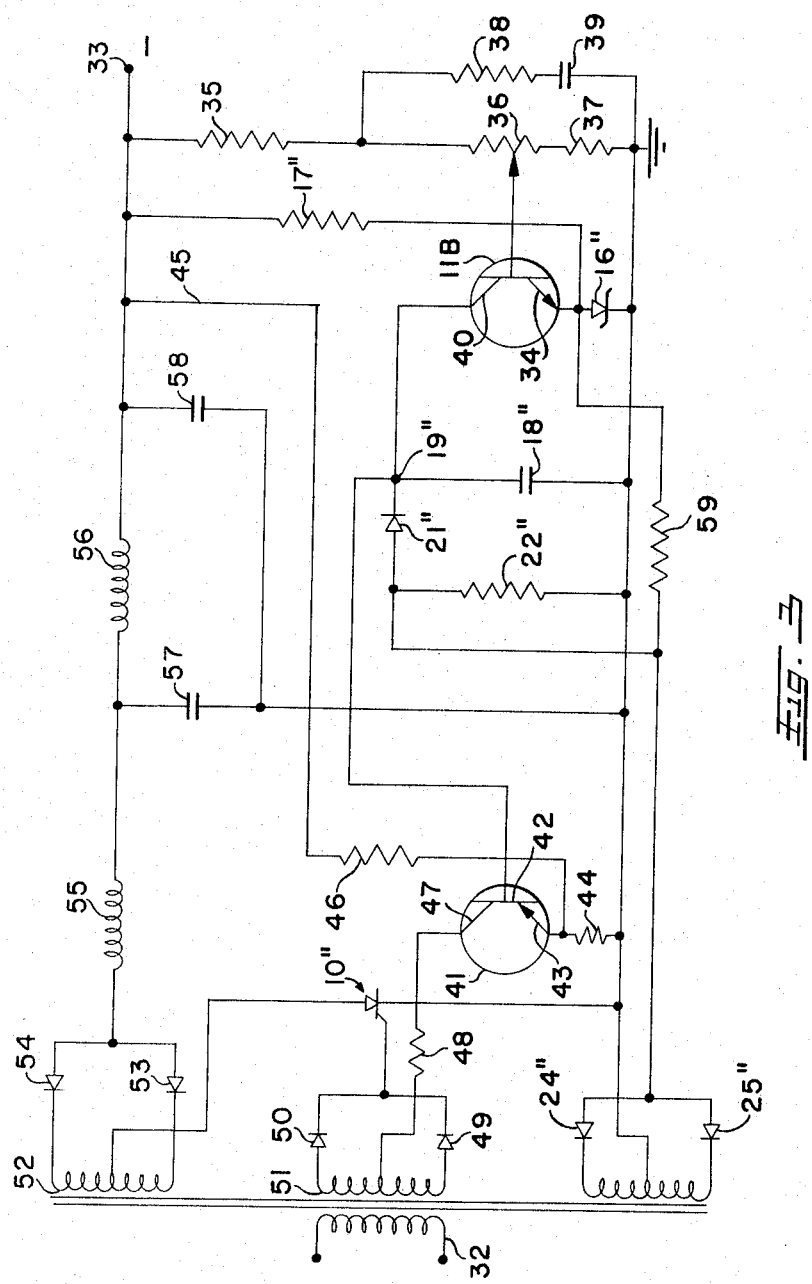
FIG. 3 is a power supply in which the new silicon controlled rectifier circuit is employed.

The basic control circuit can be applied to many operations in which the determining or regulatory factor is the controlled output of a silicon controlled rectifier. A regulated power supply is thus one such application, and a specific example of the same is shown in FIG. 3. In this power supply, the system is also relatively inverted as compared to FIG. 1 to operate on a negative ramp.

It is the function of the FIG. 3 circuit to convert an alternating current input, supplied at the transformer primary 32, into a regulated direct current output at the terminal 33, which will be a negative value as compared to ground as explained below. If the alternating current input changes in frequency or amplitude or if the output load changes, this circuit operates to change the firing angle of the silicon controlled rectifier 10" in such manner as to maintain the output voltage constant.

The primary active component is the transistor 11B, of NPN type but otherwise serving the function of the transistor 11 in the FIG. 1 circuit. The emitter 34 is connected to the anode of the zener diode 16", with the cathode of the latter at the ground potential here positive and the negative potential applied between the emitter and zener diode through the resistor 17". In this case, the signal applied to the base of the transistor 11B is derived from a voltage divider comprising resistors 35, 36 and 37 connected across the output terminals to feed back a portion of the output voltage. The resistor 36 is variable for control of the output voltage. The resistor 36 is variable for control of the magnitude of the signal, and the divider resistors 36 and 37 are bridged by a stabilizing circuit comprising a resistor 38 and capacitor 39.

The collector 40 of transistor 11B is connected to the circuit point 19" for charging the capacitor 18" also connected at such point, and there is an available discharge path provided by the diode 21" and resistor 22". There is similarly provided, again as in the FIG. 1 basic circuit, a full wave rectifier including the diodes 24" and 25" for applying the greater magnitude pulsing direct current signal thus derived from the input transformer to the resistor 22".

The capacitor 18" is here connected from the point 19" to a further transistor 41 at the base 42 of the same. This additional transistor serves as an amplifier and is biased to establish the level at which the silicon controlled rectifier 10" is caused to fire or become conductive. The emitter 43 of such transistor is connected through a resistor 44 to ground and to the output of the supply through a connection 45 in which a resistor 46 is included. The collector 47 of transistor 41 is connected through a resistor 48 to the center point of a further full wave rectifier including the diodes 49 and 50 and a secondary winding 51 also opposed to the primary input winding 32. The gate of the silicon controlled rectifier 10" is connected to the output of the full wave rectifier 49, 50 and 51, and its cathode and anode are respectively connected to ground and to the center tap of a further secondary winding 52 also opposed to the primary input winding 32. The last winding 52 is a power winding to which diodes 53 and 54 are connected to deliver full rectified power to the output terminal of the supply through a filter comprising inductors 55 and 56 associated with capacitors 57 and 58 as illustrated.

In order for this particular circuit to operate, there must be initially supplied a starting voltage across the zener diode 16" in the emitter circuit of the primary transistor 11B. Such starting voltage is provided through a resistor 59 between the negative side of this diode and the first full wave rectifier comprising the diodes 24" and 25". The starting resistor 59 is made as large as possible, so that the zener diode 16" is primarily supplied in operation by the regulated portion of the output voltage made available through the resistor 17" after the initial start has been accomplished. Moreover, the relatively large value of the resistor 59 protects the circuit in the sense that almost a complete half cycle of input is required to bring the ramp voltage up to a value large enough to effect firing of the silicon controlled rectifier. Should it thus happen that the system is turned on at a high point of the input signal, the ramp voltage will not have enough time to reach the firing level in the remaining portion of this half cycle, and the system is thus protected against high turn on current through the silicon controlled rectifier. This characteristic both improves the reliability of such component and permits a less expensive rectifier of this type to be used.

In the operation of such power supply, after the noted initial turn on has been accomplished as described, the transistor 11B and the components directly associated therewith in the manner of the basic FIG. 1 circuit operate to produce a ramp voltage which here is negative and represents the result of comparing a portion of the output voltage to the reference voltage provided by the biasing and reference voltage across the zener diode 16". The silicon controlled rectifier 10" is turned on by the rectified alternating current voltage obtained from the winding 51 of the input transformer and rectified by the diodes 49 and 50. However, current cannot flow through the silicon controlled rectifier gate until the transistor 41 effectively connects the center tap of the winding 51 to the ground. This transistor 41 conducts when the ramp voltage it receives from the basic control circuit exceeds the sum of the base-emitter voltage and the bias voltage applied to the same by the resistors 44 and 46; this conducting value has been in the neighborhood of one volt negative in actual use of the circuit. It will be further appreciated that the resistor 48 serves to limit the gate current within the permitted range of the component.

The single silicon controlled rectifier 10″ thus serves to regulate the output voltage through its connection to the input winding 52 and to the power diodes 53 and 54, with the output of the silicon controlled rectifier being varied as required by change in its firing angle to maintain the output voltage constant. It will be appreciated that this regulated power supply is very economical by reason of its independence of direct current voltage supply sources. The circuit used in this FIG. 3 supply will further be seen to show in detail one particular comparison and pulse generating circuit for regulating the silicon controlled rectifier output in accordance with a negative ramp and could, in fact, thereby in this area fulfill the function of the circuit PG in the FIG. 2 differential amplifier.

It will also be apparent to those skilled in the art that this supply could be modified by using another silicon controlled rectifier, with the two thus employed having a suitable reverse gate characteristic to permit elimination of the diodes 49, 50, 53 and 54. In this event, one end of the gate supply winding would be connected to one silicon controlled rectifier gate and the other end of the winding to the gate of the second silicon controlled rectifier.

The operation of the illustrated power supply will be understood to constitute one practical application of the basic control circuit of FIG. 1. More generally, this basic circuit can be used in any system in which a silicon controlled rectifier is to be regulated in a synchronized manner, for example, also in motor control, light dimming systems, and oven controls.

Other modes of applying the principle of the invention may be employed, change being made as regards the details described, provided the features stated in any of the following claims or the equivalent of such be employed.

I, therefore, particularly point out and distinctly claim as my invention:

1. In combination with a silicon controlled rectifier, circuit means for regulating the output thereof comprising a transistor, means for supplying a variable input signal to said transistor to produce responsive changes in the transistor current, a capacitance connected to receive current from said transistor, means for applying the voltage developed across said capacitance to the silicon controlled rectifier to determine the firing thereof, whereby such firing is a function of the input signal to the transistor, discharge circuit means for said capacitance including a resistance device and a rectifier therebetween, and means for applying a pulsing direct current voltage through said resistance device to said rectifier, the rectifier being rendered conductive at a predetermined voltage value in each pulsation thus applied to its cathode for discharging of said capacitance.

2. The combination set forth in claim 1 wherein the input signal of the transistor and the pulsating voltage applied to the rectifier are synchronized.

3. The combination set forth in claim 1 wherein a constant reference voltage is applied to said transistor for comparison therein with said input signal.

4. The combination set forth in claim 1 wherein said pulsing direct current voltage is derived from a full wave rectifier supplied from an alternating current source.

5. In combination with a silicon controlled rectifier, circuit means for regulating the output thereof comprising a transistor, means for supplying a variable input signal to said transistor to produce responsive changes in the transistor current, a capacitance connected to receive current from said transistor, means for applying the voltage developed across said capacitance to the silicon controlled rectifier to determine the firing thereof, whereby such firing is a function of the input signal to the transistor, discharge circuit means for said capacitance including a resistance device and a rectifier therebetween, and a source of full wave rectified alternating current voltage in synchronism with said input signal for applying pulsating voltage to said rectifier through said resistance device.

6. In combination with a silicon controlled rectifier, circuit means for regulating the output thereof comprising a transistor, means for applying a constant reference voltage to said transistor, means for applying a variable input signal to said transistor for comparison therein to said reference voltage, a capacitance connected to receive current from said transistor, means for applying the voltage developed across said capacitance to the silicon controlled rectifier to determine the firing thereof, whereby such firing is a function of the input signal to the transistor, discharge circuit means for said capacitance including a resistance device and a rectifier therebetween, and a source of full wave rectified alternating current voltage in synchronism with said input signal for applying pulsating voltage to said rectifier through said resistance device.

7. In combination with a silicon controlled rectifier, circuit means for regulating the output thereof comprising a transistor, means for applying a constant reference voltage to said transistor, a capacitance connected to receive current from said transistor, means for applying the voltage developed across said capacitance to the silicon controlled rectifier to determine the firing thereof, whereby such firing is a function of the input signal to the transistor, discharge circuit means for said capacitance including a resistance device and a rectifier therebetween, and means for applying a pulsing direct current voltage through said resistance device to said rectifier in synchronism with the input signal to the transistor, the rectifier being rendered conductive at a predetermined voltage value in each pulsation thus applied to its cathode for discharging of said capacitance.

8. In combination with a silicon controlled rectifier, circuit means for regulating the output thereof comprising a transistor, means for applying a constant reference voltage to said transistor, means for applying a variable input signal to said transistor for comparison therein to said reference voltage, a capacitance connected to receive current from said transistor, means for applying the voltage developed across said capacitance to the silicon controlled rectifier to determine the firing thereof, whereby such firing is a function of the input signal to the transistor, discharge circuit means for said capacitance including a resistance device and a rectifier therebetween, and means for applying a full wave rectified alternating current voltage to said rectifier through said resistance device.

9. In a control system, a silicon controlled rectifier the output of which is to be regulated, a pair of transistors connected to form a differential amplifier, means for supplying a variable input signal to one of said transistors, means for suppling a constant reference voltage to the other of said transistors for comparison with said input signal in the differential amplifier, a capacitance connected to receive current from said amplifier, means for applying the voltage developed across said capacitance to control the firing of said silicon controlled rectifier, a discharge circuit for said capacitance including a resistance and a rectifier, and means for applying pulsating direct current voltage to the rectifier, the rectifier being capable of conduction during a portion of each pulsation for discharge of the capacitance through the resistance.

10. A control system as set forth in claim 9 wherein the input signal thereto and the pulsating voltage applied to the rectifier are in synchronism.

11. A control system as set forth in claim 10 wherein said pulsating voltage is obtained from a full wave rectifier in an alternating current supply.

12. A regulated power supply comprising a silicon controlled rectifier in the output circuit of said supply, a transistor, means for applying a portion of the output voltage to said transistor as an input control signal thereto, means for providing a constant reference voltage to said transistor for comparison therein with said input control signal, a capacitance connected to receive current from the transistor, a discharge circuit for said capacitance including a resistance device and a rectifier, full wave rectifier means for applying pulsating direct current voltage to said rectifier, the rectifier being rendered conductive in each half cycle to permit discharge of the capacitance, and means for controlling the firing of the silicon controlled rectifier in accordance with the transistor regulated voltage developed across the capacitance.

13. A power supply as set forth in claim 12 wherein the control signal from the capacitance is amplified in a further transistor.

14. A power supply as set forth in claim 12 wherein the full wave rectifier means is energized by the input to the power supply and thus synchronized with the output-derived control signal to said transistor.

15. A power supply as set forth in claim 12 wherein an input starting voltage is applied to said transistor through a resistance device of relatively large value with a major portion of an input cycle required to produce a ramp voltage sufficient to fire the silicon controlled rectifier.

16. A power supply as set forth in claim 15 wherein the input starting voltage and the output of the supply, as well as the pulsating direct current voltage for the rectifier, are obtained from full wave rectifying circuits.

17. A power supply as set forth in claim 16 wherein said rectifying circuits are energized by a single input transformer.

18. A power supply as set forth in claim 17 wherein the control signal from the capacitance is amplified in a further transistor biased and connected to establish the level at which the silicon rectifier fires.

No references cited.

JOHN F. COUCH, *Primary Examiner.*

M. WACHTELL, *Assistant Examiner.*